Figure 1:
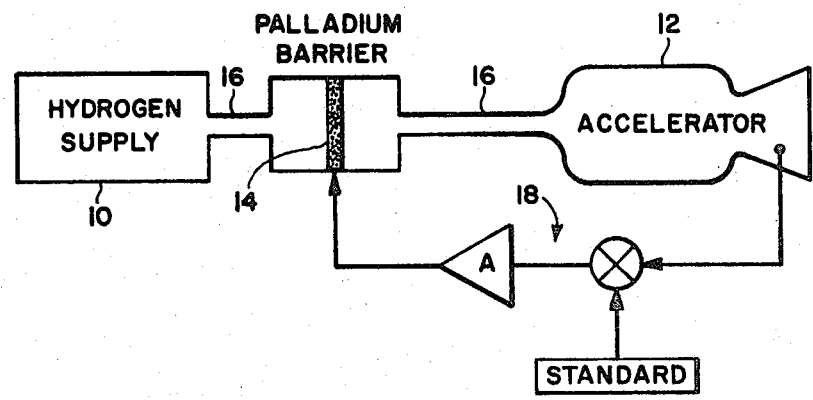

June 15, 1965  T. M. FLYNN  3,188,799
HYDROGEN POWERED ENGINES AND HYDROGEN FLOW CONTROLS
Filed Oct. 23, 1961

INVENTOR
BY THOMAS M. FLYNN
ATTORNEY

United States Patent Office 3,188,799
Patented June 15, 1965

3,188,799
HYDROGEN POWERED ENGINES AND
HYDROGEN FLOW CONTROLS
Thomas M. Flynn, Davenport, Iowa, assignor to The
Bendix Corporation, Davenport, Iowa, a corporation of
Delaware
Filed Oct. 23, 1961, Ser. No. 146,689
3 Claims. (Cl. 60—35.5)

This invention concerns improvements relating to hydrogen powered engines and hydrogen flow controls.

An object of the invention is to provide improved hydrogen powered engines, particularly of a type suitable for the propulsion of craft in space, and improved methods and means for controlling hydrogen flow which, although having broader application are advantageously employed in hydrogen powered engines.

One advantage of the invention resides in its applicability to a wide variety of the jet type of hydrogen engine in which hydrogen, per se, or in the product of a chemical union, is accelerated and exhausted from the engine whereby to give rise to a force tending to propel the engine. It provides a novel hydrogen flow control means which can be embodied in simplified and reliable structures.

Other objects and advantages of the invention will be apparent in the following description of a preferred embodiment of the invention and the accompanying drawing. It is to be understood various modifications may be made in this embodiment and that other embodiments of the invention are possible without departing from the spirit of the invention or the scope of the appended claims.

Figure 2:
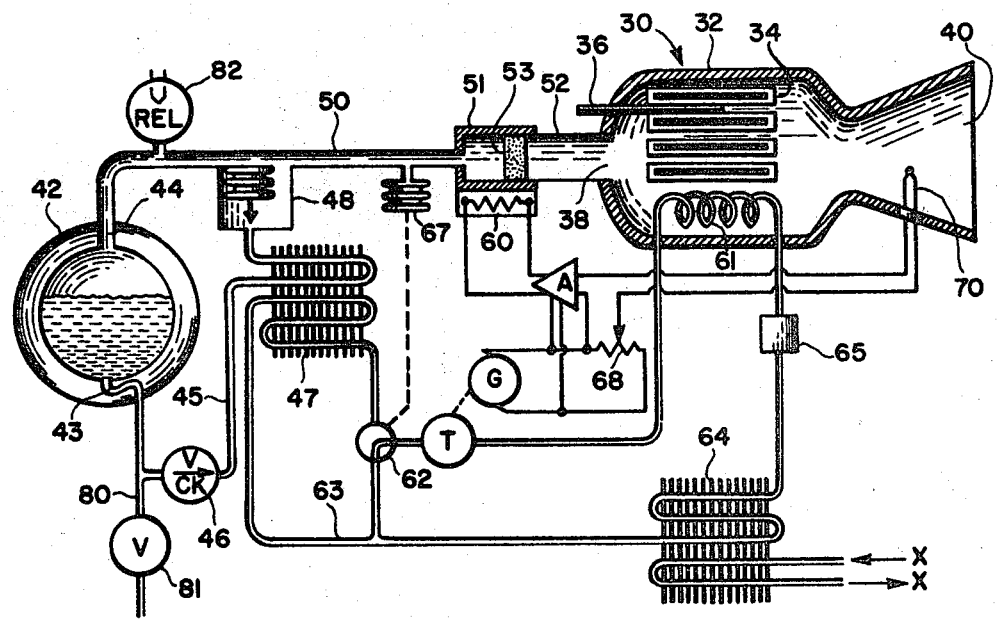

In the drawing:

FIG. 1 is a schematic illustration of a hydrogen powered engine embodying the invention; and FIG. 2 is a diagram of a hydrogen powered engine embodying the invention.

The engine shown in FIG. 1 comprises a source of hydrogen 10, an accelerator 12 for hydrogen or the product of the chemical union of hydrogen with another substance from a source not shown, and means for controlling the rate of hydrogen flow from the supply 10 to the accelerator 12. The control means includes a palladium barrier 14 extending across the flowpath 16 for hydrogen from the supply to the accelerator. Control is exercised by controlling the temperature of the palladium. While the flow rate of hydrogen through a sheet of palladium foil is variable with differential pressure across the sheet at very high temperatures, this variation is insignificant at temperatures below several hundred degrees centigrade and in palladium barriers of practical thickness. Accordingly, for practical purposes, assuming such conditions and that the pressure of hydrogen on the supply side of the barrier exceeds that on the accelerator side, a condition implicit in the terms "supply" and "accelerator," the rate at which hydrogen flows through a given barrier of palladium varies only with the temperature of the palladium and is independent of the pressure differential. The rate of hydrogen flow through the palladium barrier is small but entirely adequate for small engines such as those required to propel craft in space and the change in rate of flow over the range of easily achievable temperatures is more than adequate for practical control.

The object of such engines is to provide thrust. Means, generally designated 18, are provided for comparing actual thrust with desired thrust and for altering the temperature of the palladium to vary the hydrogen flow rate as a function of the difference between actual and desired thrust.

A specific form of the engine is diagrammed in FIG. 2. It comprises an accelerator 30 comprising a housing 32 containing a nuclear reactor 34 with control rod 36. The housing has an inlet 38 for hydrogen entering the housing and an outlet 40 for the hydrogen leaving the housing after being heated and expanded by the reactor 34 through which it flows.

A source of hydrogen is provided which may, as shown, comprise a liquid-to-gas conversion system. Liquid hydrogen is contained in an insulated vessel 42 having means, not shown, for maintaining the body of liquid adjacent the liquid-phase opening 43 even in the zero-G force condition and for insuring that the hydrogen gas is adjacent the gaseous phase opening 44. Openings 43 and 44 are connected by a conduit 45 traced from opening 43 through a liquid check valve 46, a heat exchanger 47, a pressure closing valve 48 and thence to opening 44.

Liquid hydrogen flowing from opening 43 through check valve 46 to the heat exchanger 47 is there converted to gas which flows past valve 48 and through opening 44 to the vessel's ullage space until a pressure is reached at which the pressure closing valve 48 closes to stop the process. Valve 48 remains closed until pressure in the system is reduced below the valve opening value by withdrawal of hydrogen gas through conduit 50 which leads to the palladium barrier. While other hydrogen storage means may be employed, the system shown is advantageously employed because it permits cold hydrogen gas to be supplied to the palladium barrier. The advantage will hereinafter be more fully explained.

A flow path for hydrogen extends from the source system to the accelerator. It comprises, in series, the conduit 50, a palladium barrier containing structure 51, and a conduit 52. The palladium barrier comprises a wall of palladium 53 extending across the flow path.

The rate of hydrogen flow is controlled in the invention by the method of varying the temperature of a palladium barrier across the flowpath. Means are provided for altering the temperature of the palladium barrier 53. It is cooled to reduce flow rate and heated to increase flow rate. A variety of well known means are suitable for accomplishing heating and cooling. Peltier junctions or solar radiation admitted in variable amount, for example, may be employed or, advantageously and as shown, the barrier may be cooled by cold hydrogen gas from the source and heated by conduction from an electrically energized resistance heater such as a resistance heater 60 attached in heat conducting relation to the barrier containing structure 51 and the barrier 53.

Electrical power for the heater may be derived from the nuclear reactor. The engine selected for illustration in FIG. 2 includes an auxiliary power system comprising a conduit for liquid traced from heating coils 61 in the accelerator 30 through a turbine T to a two-way valve 62 to a junction 63, thence through a heat exchanger 64 to an expansion pump 65 back to the heating coils 61. Valve 62 is actuated by a pressure responsive mechanism 67 of any of the well known forms which in this case is responsive to the pressure in the hydrogen supply system. In the condition illustrated, supply pressure is adequate and valve 62 is adjusted to connect the conduit leading from turbine T directly to juntcion 63. When pressure in the supply system is reduced to a selected value by withdrawal of gas through conduit 50, then actuator 67 repositions valve 62 to complete the circuit from the outlet of turbine T through heat exchanger 47 to junction 63. In this condition liquid hydrogen in conduit 45 on the supply side of heat exchanger 47 will be heated and converted to gas to repressurize the system.

Turbine T drives an electrical power generator G whose output power is applied both to a potentiometer 68 and to the power circuit of an amplifier A. The output of amplifier A is applied to the heater 60 whereby the palladium barrier is heated.

Means are provided for controlling the palladium temperature in accordance with the degree in which engine thrust differs from desired thrust. This means may, as in the embodiment shown, comprise means for controlling palladium temperature as a function of engine exhaust temperature because thrust is a function of exhaust temperature. The voltage generated in a temperature responsive junction is compared with a standard voltage taken across a portion of potentiometer 68. This standard voltage is equal to the voltage produced at the junction when engine thrust has the desired value. The difference between the standard voltage and actual junction voltage is applied as the input signal to amplifier A whereby the heater 60 is energized proportionally to that difference when the standard voltage exceeds the junction voltage. The temperature responsive junction is disposed in the accelerator outlet 40 and is designated 70. It is connected in series opposition to the voltage across that portion between the tap and one end of potentiometer 68 across the amplifier A input terminals.

Other elements in FIG. 2 are a conduit 80 and valve 81 for filling vessel 42, a relief valve 82 for venting overpressures in the supply system, and the secondary side of heat exchanger 64 by which excessive heat in the auxiliary power circuit is carried away to heat sinks and other loads designated generally as $xx$.

I claim:

1. A hydrogen powered engine comprising source means having an outlet for storing hydrogen, an accelerator having an inlet and an outlet, a flowpath interconnecting the outlet of the storage means and the inlet of the accelerator including a palladium wall extending across said flowpath, and means for controlling the flow rate of hydrogen from said source means to said accelerator including means sensitive to the degree in which temperature in the outlet of said accelerator differs from a selected temperature for varying the temperature of said palladium wall inversely as a function of said degree.

2. The invention defined in claim 1 in which said source means comprises means for storing hydrogen in the liquid state, in which said means for controlling the flow rate from said source means to said accelerator comprises means for converting said liquid hydrogen to gaseous hydrogen at temperatures below the palladium barrier temperature corresponding to the flow rate for desired engine thrust, and in which said means for controlling the flow rate from said source means to said accelertator further comprises means for increasing the temperature of said palladium barrier as a function of the degree in which engine thrust is less than desired engine thrust.

3. A hydrogen flow rate controller comprising a flowpath for hydrogen, a palladium wall extending across said flowpath, and means for varying the temperature of said palladium directly as a function of the difference between a selected flow rate and the actual flow rate of hydrogen.

References Cited by the Examiner

UNITED STATES PATENTS

| | | | |
|---|---|---|---|
| 2,894,891 | 7/59 | Grebe | 60—35.5 X |
| 2,974,475 | 3/61 | Kolfenbach et al. | 60—35.6 X |

OTHER REFERENCES

Nuclear Science Abstracts, U.S. Atomic Energy Commission, Office of Technical Information, vol. 14, No. 20, page 2628, Abstract 20,392.

JULIUS E. WEST, *Primary Examiner.*

EDGAR W. GEOGHEGAN, *Examiner.*